United States Patent [19]
McLane

[11] Patent Number: 6,102,437
[45] Date of Patent: Aug. 15, 2000

[54] VEHICLE STABILIZER GUARD

[76] Inventor: Jerry D. McLane, 3127 Bayberry Dr. SW., Cedar Rapids, Iowa 52404

[21] Appl. No.: 09/058,423

[22] Filed: Apr. 9, 1998

[51] Int. Cl.[7] .................................................. B60S 9/04
[52] U.S. Cl. ...................... 280/763.1; 280/851; 280/848; 254/419
[58] Field of Search .................................. 254/122, 126, 254/418, 419, 424, 425; 280/763.1, 764.1, 765.1, 766.1, 851, 848, 154, 762, 850, 855

[56] References Cited

U.S. PATENT DOCUMENTS

| | | | |
|---|---|---|---|
| 3,781,035 | 12/1973 | Petersson et al. | 280/764.1 |
| 4,043,568 | 8/1977 | Hollon | 280/851 |
| 4,268,053 | 5/1981 | Toppins et al. | 280/154 |
| 4,449,746 | 5/1984 | Clark | 296/1 R |
| 4,627,594 | 12/1986 | Reed | 248/632 |
| 4,784,400 | 11/1988 | Hofius | 280/763.1 |
| 4,921,269 | 5/1990 | Scully | 280/475 |
| 5,451,080 | 9/1995 | Kneile | 248/354.1 |

FOREIGN PATENT DOCUMENTS 5-50898  3/1993  Japan .................................. 280/763.1

*Primary Examiner*—Brian L. Johnson
*Assistant Examiner*—Avraham H. Lerner
*Attorney, Agent, or Firm*—Simmons, Perrine, Albright & Ellwood, PLC

[57] ABSTRACT

A method and apparatus for protecting stabilizing jacks mounted on a travel trailer from contaminations which may be incident on the leading edge of a stabilizer jack when the travel is being pulled.

12 Claims, 2 Drawing Sheets

VEHICLE STABILIZER GUARD

The present invention generally relates to travel trailers and more particularly relates to travel trailers having stabilizing jacks mounted to the undercarriage of the travel trailer.

BACKGROUND OF THE INVENTION

In the past, owners of travel trailers have often desired to stabilize and level their travel trailers while the trailers are parked for extended periods of time. One of the methods that has been employed in the past to stabilize and level travel trailers has been to use jacks, including screw jacks, hydraulic jacks, scissor jacks, and various other jack types, which are positioned between the undercarriage of the travel trailer and the surface of the ground immediately below the travel trailer. When these jacks were successfully deployed, they would greatly limit any rocking or other motion that might be caused by various sources including wind or movement of the inhabitants or occupants inside of the travel trailer. While this method of stabilizing trailers has been used successfully for many years, it did have several drawbacks. First of all, storage of the jacks while transporting the trailer to a different location often was troublesome or bothersome. Additionally, mating the jack to the travel trailer could at times be difficult if the terrain beneath the trailer were uneven.

In recent years, many travel trailers have been including permanently mounted stabilizing jacks which are affixed to the undercarriage of the trailer. These jacks have proven to be convenient in that they do not require storage, nor do they require mating of the jack to the trailer undercarriage on each use. Typically, these jacks are scissor jacks, but any type of jack could be used. The jacks are often operated by a lever or crank which is inserted into the jack and manipulated to either raise or lower the jack base to a desired level. The lever handle or crank would then be typically stored in the vehicle until its use was again needed at a later time.

While these jacks have enjoyed much success in the recent years, they, too, have several serious drawbacks. The most troubling drawback of these permanently attached stabilizer jacks has been they are often difficult to manipulate or crank down as a result of exposure to the elements. When these trailers are pulled behind a vehicle, they are exposed to rain, snow, sand, gravel, and other debris which might be present on or about a roadway. If this debris or other contamination comes in contact with the gears or internal mechanisms of the stabilizing jack, it often results in increased resistance, thereby making it more difficult to manipulate the jack to its desired position. Additionally, repeated use of the jack with debris and/or contamination in vital areas often results in accelerated wear on the moving parts of the jack. This accelerated wear may result in the need for replacement of the stabilizing jacks if they are operated in harsh conditions and with considerable frequency.

Consequently, there exists a need for improved methods and apparatuses for stabilizing a travel trailer in a manner which is relatively easy to operate and which has an extended life span.

SUMMARY OF THE INVENTION

It is an object of the present invention to provide an easy way to stabilize a travel trailer which has been transported over a road surface having contamination, snow or other debris thereon.

It is a feature of the present invention to include a debris barrier about the jack so as to protect the jack from contamination by such debris.

It is an advantage of the present invention to reduce the resistance in a jack which is caused by debris or contamination in the jack mechanism.

It is another object of the present invention to enhance the usable life span of a stabilizer for travel trailers.

It is another feature of the present invention to have a flexible guard which can partially protect one or more sides of a stabilizer jack mounted to the undercarriage of a travel trailer.

It is another advantage of the present invention to provide protection to the underside of a jack during transportation of the trailer and also providing for an unobstructed path for the jack to be extended downward while the trailer is parked.

The present invention is a method and apparatus for protecting stabilizing jacks for travel trailers which are designed to satisfy the aforementioned needs, provide the previously stated objects, include the above listed features, and achieve the already articulate advantages. In the present invention, the contamination that is often incident upon the leading edge and bottom side of the jack while it is being transported is significantly reduced.

Accordingly, the present invention is a method and apparatus for providing a barrier protecting the leading edge and the bottom side of a stabilizing jack mounted to a travel trailer undercarriage.

BRIEF DESCRIPTION OF THE DRAWINGS

The invention may be more fully understood by reading the following description of the preferred embodiments of the invention, in conjunction with the appended drawings wherein.

DETAILED DESCRIPTION OF THE DRAWINGS

Figure 1:
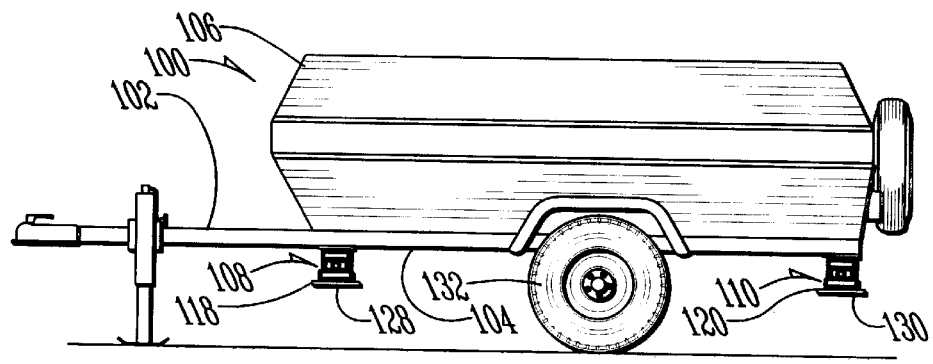
FIG. 1 is an elevation view of a travel trailer, of the prior art, having stabilizing jacks mounted to its undercarriage.

Now referring to the drawings, wherein like numerals refer to like matter throughout, and more particularly to FIG. 1, there is shown an elevation view of a travel trailer of the prior art generally designated 100, having a tongue 102, an undercarriage 104, a cabin 106, a first stabilizing jack 108, and a second stabilizing jack 110. Stabilizing jacks 108 and 110 are shown having leading edges 118 and 120 respectively and further showing bottom sides 128 and 130 respectively.

In operation, the jacks 110 and 108 are frequently exposed to contaminants which are either propelled by the wheels 132 of the travel trailer 100 or the wheels of the pulling vehicle (not shown) or are otherwise found around and about the road surface.

Figure 2:
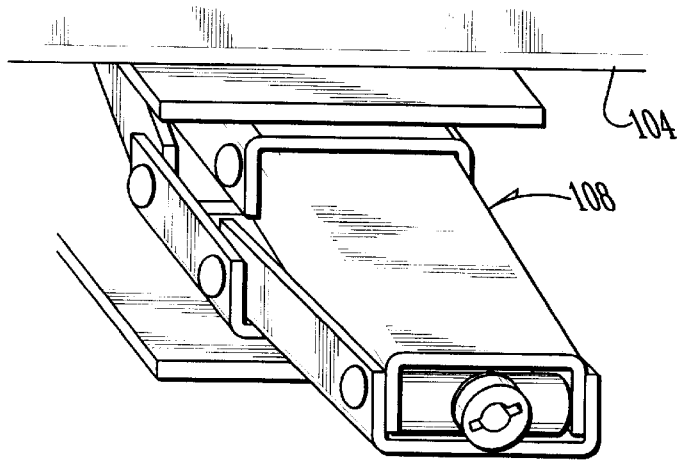
FIG. 2 is an enlarged elevation view of a portion of FIG. 1 which shows the stabilizing jack mounted underneath a beam forming a portion of the undercarriage of the travel trailer.

Now referring to FIG. 2, there is shown an enlarged elevation view of a portion of FIG. 1 which shows the stabilizing jack 108 and the undercarriage 104 in more detail.

Figure 3:
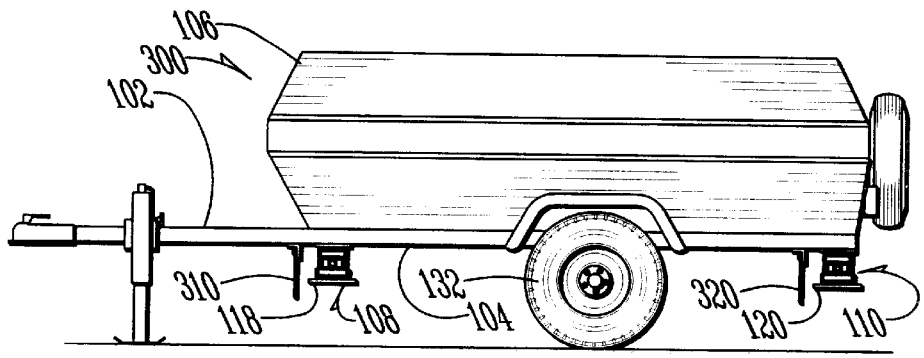
FIG. 3 is an elevation view of a travel trailer, of the present invention, including a stabilizing guard, of the present invention, disposed forward of the stabilizing jacks mounted to the undercarriage of the travel trailer.

Now referring to FIG. 3, there is shown a travel trailer of the present invention, generally designated 300 having a tongue 102, an undercarriage 104, a cabin 106, and first and second stabilizing jacks 108 and 110. FIG. 3 further showing a first stabilizing jack guard generally designated 310 and a second stabilizing jack guard generally designated 320, which are disposed forward of leading edges 118 and 120 of stabilizing jacks 108 and 110.

Figure 4:
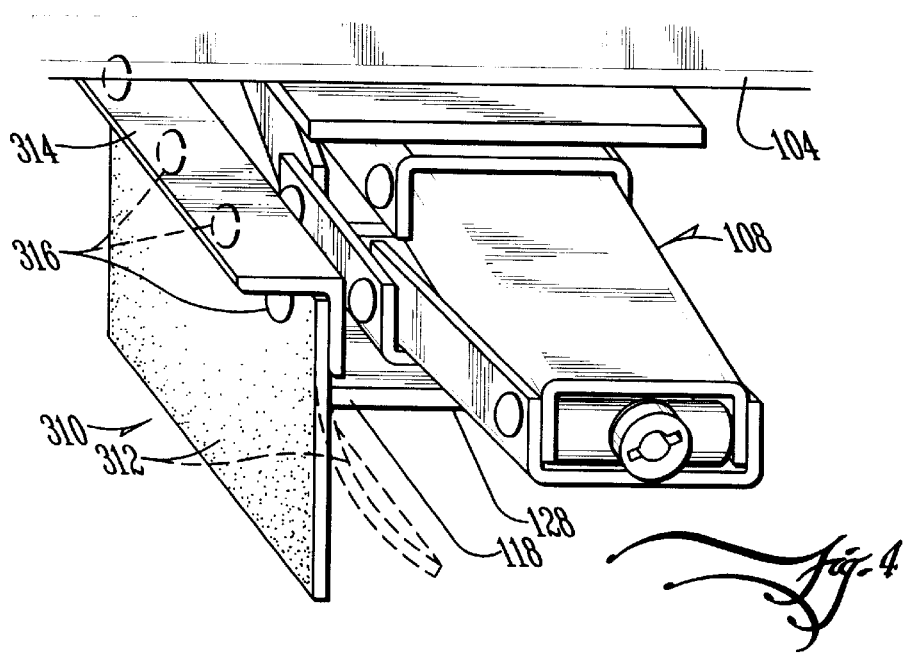
FIG. 4 is an enlarged elevation view of a portion of FIG. 3 which shows the stabilizing jack guard, of the present invention, in conjunction with the stabilizing jack mounted to the undercarriage.

Now referring to FIG. 4, there is shown an enlarged elevation view of a portion of FIG. 3, which includes stabilizer jack guard 310 having guard member 312, bracket member 314, and fasteners 316. Guard member 312 is shown disposed in a substantially vertical direction which represents its position when the trailer is parked. The dotted line represents the shape and position of guard member 312 while the trailer 300 is being transported. Air resistance caused by the relative movement of the air with respect to the guard member 312 causes guard member 312 to bend in a direction toward leading edge 118 and in a direction so that at least portions of bottom side 128 are protected from direct contact with airborne contamination.

Guard member 312 is preferably planar in shape, but any suitable shape could be substituted, and sufficiently long to protect the entire length of the stabilizing jack 108 from direct exposure to airborne contaminants reaching the leading edge 118. Preferably guard member 312 is made of a semi-rigid and durable material such as rubber, plastic or vinyl as are often found in vehicle mud flaps; however, a fully rigid guard member could be utilized as well. It is preferable that the guard member 312 be sufficiently flexible and pliable that it would be cause to be deflected into a shape similar to that shown by dotted line 312$^1$ when the vehicle is in motion. Preferably the guard member 312 is sufficiently resilient that upon termination of forward movement, and its associated air resistance, the guard member 312 will hang in a relatively vertical manner so that the bottom edge 118 of stabilizer jack 108 is free to be manipulated in a downward fashion without interference by guard member 312.

Figure 5:
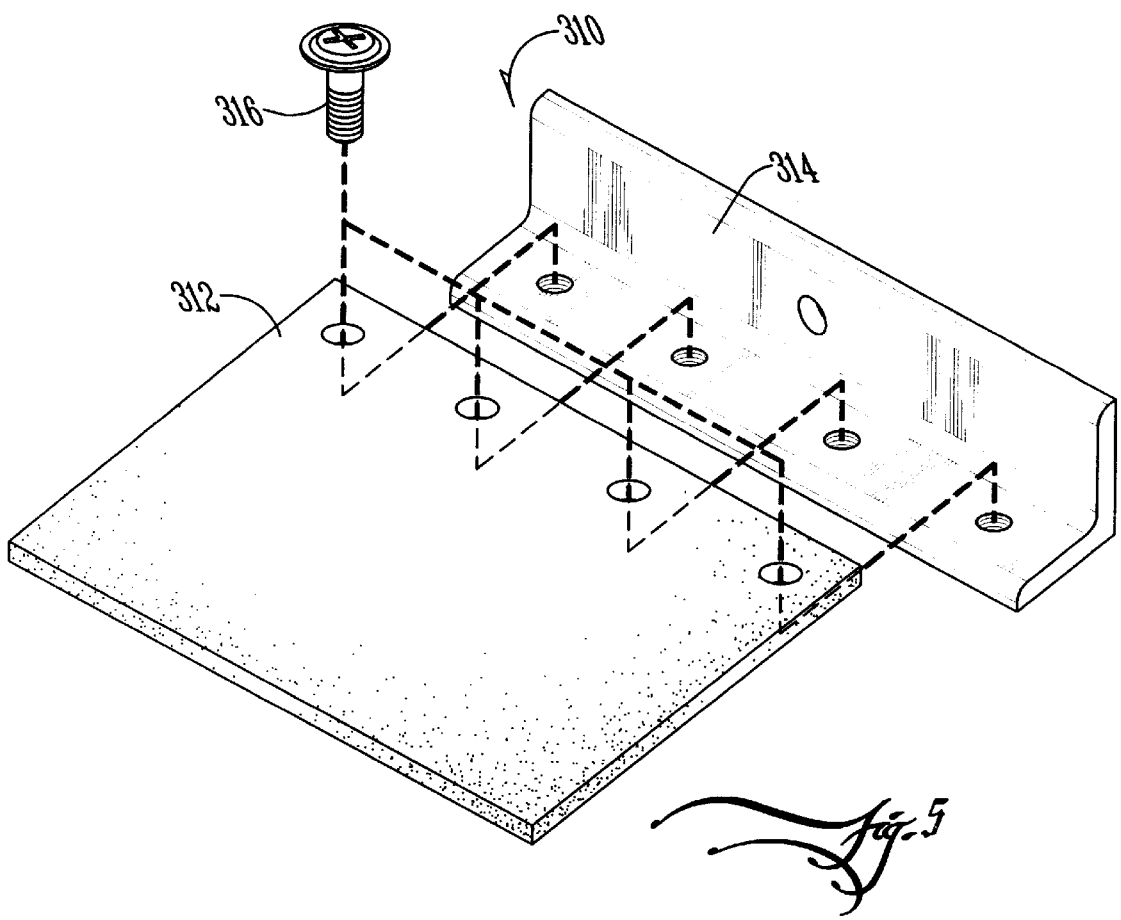
FIG. 5 is an exploded view of the stabilizing jack guard of the present invention showing the guard, a mounting bracket, and fasteners for coupling the guard to the bracket.

Now referring to FIG. 5, there is an exploded view of the stabilizer guard 310 of FIGS. 3 and 4 which show the components thereof including guard member 312, bracket member 314 and fasteners 316. Guard member 312 is shown having a plurality of holes disposed therethrough. Similarly, bracket member 314 is shown having a plurality of holes disposed therethrough. Fasteners 316 are shown for insertion between and interconnecting the holes of the bracket member and of the guard member. It is understood that these fasteners could be comprised of many different materials, including screws, bolts, rivets, staples. Similarly, it is understood that the guard member 312 could be affixed to bracket member 314 with the aid of an adhesive or chemical bonding process. Bracket 314 is shown having an undercarriage mounting hole 318 disposed therethrough for cooperation with the undercarriage 104. It should be understood that alternate means of attachment between the bracket 314 and the undercarriage 104 could be accomplished, including bolts, screws, adhesives, welding or any other means of attachment.

Similarly, it is understood that guard member 312 could be directly attached to frame or undercarriage 104 by similar means of bolts, screws, adhesive, welding or any other means of attachment.

Throughout this description, the inventor has chosen to explain his invention in reference to travel trailers. However, it should be understood that the invention is intended to be utilized on and encompass uses of a stabilizing jack guard on any type of vehicle, either a trailer or a motorized vehicle such as a motor home or a fifth wheel trailer. The FIGS. 1 and 3 show a travel trailer, but it should be readily understood that alternate vehicle types are equally applicable.

It is thought that the method and apparatus of the present invention will be understood from the foregoing description, and it will be understood from the foregoing description that it will be apparent that various changes may be made in the form, construction, steps, and arrangement of the parts and steps thereof without departing from the spirit and scope of the invention or sacrificing all of their material advantages, the form herein being described is merely a preferred or exemplary embodiment thereof.

What is claimed is:

1. An apparatus comprising:

a jack attached to an undercarriage of a vehicle, where the jack has a leading edge in the direction of normal forward motion of the vehicle;

a barrier extending downward from an undercarriage and positioned in front of the leading edge of the jack;

wherein said barrier is a flexible barrier;

wherein said flexible barrier has a predetermined characteristic of rigidity such that when the vehicle is in motion, the barrier bends toward said jack;

wherein said flexible barrier has a predetermined length such that said barrier extends beyond a lowest portion of said jack; and wherein said predetermined characteristic of rigidity is such that during forward motion of the vehicle, said barrier bends toward the jack and further extends between a lowest portion of the jack and a surface over which the vehicle is moving.

2. An apparatus of claim 1 wherein the vehicle is a trailer.

3. An apparatus of claim 1 wherein said flexible barrier is a mud flap.

4. An apparatus comprising:

a jack affixed to an underside of a vehicle;

means for forming a barrier between said jack and matter which would otherwise be incidental upon said jack when the vehicle is in motion;

means for coupling said means for forming to the underside of the vehicle;

wherein said means for forming comprise a flexible guard disposed on a side of the leveling apparatus in a direction of typical motion of said vehicle; and wherein said flexible guard extends beyond and in front of said leveling apparatus when the vehicle is not in motion and under said leveling apparatus when the vehicle is in motion.

5. A protector of claim 4 wherein said means for coupling is a bracket.

6. A protector of claim 5 wherein said bracket further has a single mounting hole therein for connection to said vehicle.

7. A protector of claim 6 wherein said bracket further having three mounting holes therein for connection to said flexible guard.

8. A protector of claim 7 wherein said flexible guard is a rubber flap.

9. A protector of claim 4 wherein said means for forming is a vinyl guard.

10. A protector of claim 4 wherein said leveling apparatus is a scissor jack.

11. A method for protecting portions of an underside of a leveling apparatus coupled to a vehicle comprising the steps of:

positioning a flexible barrier in a first direction from said leveling apparatus;

moving said vehicle so that said flexible barrier is caused to bend in a direction toward said leveling apparatus; and wherein said flexible barrier hangs below the underside of said leveling apparatus and has a predetermined rigidity characteristic which results in bending of said barrier to a point below said underside of said leveling apparatus and aft of a front side of said leveling apparatus.

12. A method of claim 11 wherein said level apparatus is a scissor jack.

* * * * *